US011535549B2

(12) United States Patent
Dejneka

(10) Patent No.: US 11,535,549 B2
(45) Date of Patent: Dec. 27, 2022

(54) MULTICHROIC GLASSES WITH PRASEODYMIUM AND NEODYMIUM

(71) Applicant: Corning Incorporated, Corning, NY (US)

(72) Inventor: Matthew John Dejneka, Corning, NY (US)

(73) Assignee: Corning Incorporated, Corning, NY (US)

( * ) Notice: Subject to any disclaimer, the term of this patent is extended or adjusted under 35 U.S.C. 154(b) by 437 days.

(21) Appl. No.: 16/093,459

(22) PCT Filed: Apr. 13, 2017

(86) PCT No.: PCT/US2017/027314
§ 371 (c)(1),
(2) Date: Oct. 12, 2018

(87) PCT Pub. No.: WO2017/180811
PCT Pub. Date: Oct. 19, 2017

(65) Prior Publication Data
US 2022/0073413 A1 Mar. 10, 2022

Related U.S. Application Data

(60) Provisional application No. 62/322,562, filed on Apr. 14, 2016.

(51) Int. Cl.
*C03C 3/095* (2006.01)
*C03C 4/12* (2006.01)

(52) U.S. Cl.
CPC ............... *C03C 3/095* (2013.01); *C03C 4/12* (2013.01)

(58) Field of Classification Search
CPC .................................. C03C 3/095; C03C 4/12
See application file for complete search history.

(56) References Cited

U.S. PATENT DOCUMENTS

| 2,397,004 | A | 3/1946 | Harbert et al. |
| 2,552,125 | A | 5/1951 | Tillyer |
| 3,338,696 | A | 8/1967 | Dockerty |
| 3,682,609 | A | 8/1972 | Dockerty |
| 3,941,605 | A | 3/1976 | Yamashita |
| 4,376,829 | A | 3/1983 | Daiku |
| 5,039,631 | A | 8/1991 | Krashkevich et al. |
| 5,674,790 | A | 10/1997 | Araujo |
| 8,183,170 | B2 | 5/2012 | Brocheton |
| 2006/0128550 | A1 | 6/2006 | Leister et al. |
| 2010/0073765 | A1* | 3/2010 | Brocheton ............ C03C 4/085 |
| | | | 359/361 |

| 2016/0264864 | A1 | 9/2016 | Dejneka et al. |

FOREIGN PATENT DOCUMENTS

| CN | 1140150 | A | | 1/1997 | |
| CN | 101497498 | A | | 8/2009 | |
| CN | 105120705 | A | | 12/2015 | |
| DE | 2436464 | A1 | | 11/1975 | |
| FR | 2263202 | A1 | | 10/1975 | |
| GB | 1435408 | A | | 5/1976 | |
| GB | 2426005 | A | | 11/2005 | |
| GB | 2426005 | A | * | 11/2006 | ............. C03C 3/095 |
| JP | 53085813 | A | | 7/1978 | |
| JP | 57071834 | A | | 5/1982 | |
| JP | 50-121307 | A | | 9/1987 | |
| RU | 2016860 | C1 | | 7/1994 | |
| RU | 2327656 | C1 | | 6/2008 | |
| SU | 727586 | A1 | | 4/1980 | |

(Continued)

OTHER PUBLICATIONS

Clayden et al; "Solid State 27Al NMR and FTIR Study of Lanthanum Aluminosilicate Glasses"; Journal of Non-Crystalline Solids 258 (1999) pp. 11-19.
Desa et al; "Optical Properties of Pr and Nd Ions in a Borate Glass"; Glass Tech.: Eur. J. Glass Sci. Technol. A, Aug. 2009; 50 (4); pp. 230-232.
Hwa et al; "Elastic Properties of Lanthanum Aluminosilicate Glasses"; Materials Research Bulletin 39 (2004) pp. 33-40.
International Search Report and Written Opinion of the International Searching Authority; PCT/US2017/027314; dated Jun. 9, 2017; 24 Pages; European Patent Office.
Kotani et al; "Specific Heats and Gruneisen Constant of Aluminosilicate Glasses Containing Rare-Earth Oxides"; Journal of the Ceramic Society of Japan; 103 [7] (1995) pp. 733-736.
Chinese Patent Application No. 201780023740.9, Office Action dated Apr. 30, 2021, 17 pages (5 pages of English Translation and 12 pages of Original Document), Chinese Patent Office.

*Primary Examiner* — Karl E Group
*Assistant Examiner* — Cameron K Miller
(74) *Attorney, Agent, or Firm* — Svetlana Short

(57) ABSTRACT

A glass that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Further, the sum of any chromophores in the glass from the group $V_2O_5$, $Cr_2O_3$, $MnO$, $Mn_2O_3$, $Fe_2O_3$, $CoO$, $Co_3O_4$, $CuO$, $NiO$, $Nb_2O_5$, $CeO_2$, $Ho_2O_3$ and $Er_2O_3$ is less than 0.1 mole %. The glass can be characterized by a substantially pink color upon exposure to an incandescent light source and a substantially green color upon exposure to a fluorescent light source. The glass can optionally include one or more fluorescent ions selected from oxides of Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %.

17 Claims, No Drawings

(56) References Cited

FOREIGN PATENT DOCUMENTS

| | | |
|---|---|---|
| SU | 1096242 A1 | 6/1984 |
| SU | 1121247 A1 | 10/1984 |
| SU | 1273339 A1 | 11/1986 |
| SU | 1655925 A1 | 6/1991 |
| WO | 2006120663 A1 | 11/2006 |
| WO | 2015/077136 A2 | 5/2015 |

* cited by examiner

MULTICHROIC GLASSES WITH PRASEODYMIUM AND NEODYMIUM

This application claims the benefit of priority under 35 U.S.C. § 365 of International Patent Application Serial No. PCT/US2017/27314, filed on Apr. 13, 2017, which claims benefit to U.S. Provisional Application Ser. No. 62/322,562 filed on Apr. 14, 2016, the content of which is relied upon and incorporated herein by reference in its entirety.

FIELD

The present specification generally relates to color-changing glasses and glass articles comprising color-changing materials and, more specifically, to customizable, multichroic glasses and glass articles comprising multichroic materials.

BACKGROUND

Some glass compositions that change color when exposed to varying light conditions are known. However, the color shift in these glasses is not customizable and, thus, they are not suitable for many uses, particularly anti-counterfeiting schemes. Further, the color shift in some of these glasses is not aesthetically pleasing for purposes of art and or decorative applications.

Various anti-counterfeiting schemes have been developed for consumer products including fine wine, watches, jewelry and other products subject to high volumes of counterfeiting activities. Many of these schemes rely on "black box" sensors to determine if a particular good is genuine or counterfeit. Unfortunately, these schemes suffer from the prevalence of counterfeit "black boxes" that provide false indications that a particular good is genuine.

Therefore, glasses with controlled, color-changing capabilities when exposed to varying light conditions have a number of desirable applications. Further, anti-counterfeiting schemes that can be used directly by a consumer without the need for additional sensors are also desirable.

SUMMARY

According to one embodiment, a glass is provided that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 1 and less than 1.9. Further, CoO, if present, is less than 0.01 mole % and $Fe_2O_3$, if present, is less than 0.004 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, the glass can optionally include at least one chromophore selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$, such that the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ is less than 0.1 mole %.

In another embodiment, a glass is provided that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Further, the sum of $V_2O_5$, $Cr_2O_3$, $Mn_2O_3$, $Fe_2O_3$, CoO, $Co_3O_4$, CuO, NiO, $Nb_2O_5$, $CeO_2$, $Ho_2O_3$ and $Er_2O_3$ chromophores in the glass, if any of these chromophores are present, is less than 0.1 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, an aspect of this glass includes at least one chromophore selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$.

In a further embodiment, a glass is provided that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than or equal to 0.9 and less than or equal to 2.0. Further, $Ce_2O_3$, if present, is less than 1 mole %, $Fe_2O_3$, if present, is less than 0.4 mole %, $Mn_2O_3$, if present, is less than 0.04 mole %, $Er_2O_3$, if present, is less than 1 mole %, and $Nb_2O_5$, if present, is less than 0.5 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, the glass can optionally include at least one chromophore selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$, such that the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ is less than 0.1 mole %.

In an additional embodiment, a glass is provided that includes $SiO_2$ at greater than 70 mole %, along with $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Further, the sum of $Fe_2O_3$, $CeO_2$, and $TiO_2$, if any are present, is less than 1 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, the glass can optionally include at least one chromophore selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$, such that the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ is less than 0.1 mole %.

In further embodiments, any of the foregoing glasses can be characterized by a first color upon exposure to an incandescent light source and a second color upon exposure to a fluorescent light source, the first and second colors distinct from one another. For example, the first color is substantially pink and the second color is substantially green in an aspect of these glasses. In addition, aspects of these glasses can be further characterized by a color difference (CD) of at least 3.0 from being subjected to a D65-10 illumination condition and an F02-10 illumination condition.

In another aspect of these glasses, the ratio of $Nd_2O_3$ to $Pr_2O_3$ is greater than 0.75 and less than 2.0. In another aspect, the ratio of $Nd_2O_3$ to $Pr_2O_3$ is greater than 1.1 and less than 1.9. Further, in additional aspects, the $Pr_2O_3$ can range from about 0.7 to about 3.0 mole % and the $Nd_2O_3$ can range from about 1.0 to about 4 mole % in certain implementations.

In a further aspect of the disclosure, a glass article is provided that includes a first multichroic portion having a first glass composition; and a second multichroic portion having a second glass composition comprising a composition that differs from the first glass composition. The first glass composition includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Further, the sum of $V_2O_5$, $Cr_2O_3$, $Mn_2O_3$, $Fe_2O_3$, CoO, $Co_3O_4$, CuO, NiO, $Nb_2O_5$, $CeO_2$, $Ho_2O_3$ and $Er_2O_3$ chromophores in the glass, if any of these chromophores are present, is less than 0.1 mole %. In certain aspects, the first and second multichroic portions cause a pattern in the article to appear or disappear upon being subjected to an illuminant change from a first illuminant to a second illuminant.

In an additional aspect of the disclosure, a glass article is provided that includes a substrate comprising a glass according to any of the foregoing compositions. The substrate further comprises a compressive stress region having a maximum compressive stress of at least 50 MPa and a depth of layer (DOL) of at least 15 microns in thickness.

In another aspect of the disclosure, a glass article is provided that includes a container comprising a glass according to any of the foregoing compositions. Further, the container is configured to contain at least one liquid or solid medium. In some aspects, the container is configured as a perfume bottle, a cologne bottle, a medicine bottle, or an electronic device case. In an additional aspect, the glass is further configured for an anti-counterfeiting system.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

It is therefore desirable to provide glasses with controlled, color-changing capabilities when subjected to, exposed to, or otherwise illuminated by varying light conditions. It is also desirable to provide inexpensive anti-counterfeit schemes that can be incorporated into an article that allow a purchaser to more easily determine whether a good is genuine or counterfeit.

Accordingly, color-changing glasses of the disclosure offer one or more of the following advantages. For example, color-changing glass embodiments do not require expensive gemstones or single crystal additives to achieve color shifts. Further, the varying light conditions that impart color changes in glasses of the disclosure are readily available to the consumer. These conditions include full spectrum light (e.g., sunlight and incandescent light) and the narrow atomic emission lines of fluorescent lighting. RGB white light from LEDs and mobile device displays provide yet another illumination source that can impart an additional color. The anti-counterfeiting schemes offered by glasses of the disclosure can rely on the human eye, without the need for additional sensors that themselves could be counterfeit. Another benefit of glasses of the disclosure is that their color-shifts are interesting and can be tailored for particular decorative or artistic effects. A further benefit is that artistic articles can contain multiple glass compositions of the disclosure to produce interesting patterns (e.g., in layered composites). These patterns can either switch color with their background, or disappear or appear as the illumination conditions are changed. Another benefit is that the base glass composition is flexible, which can include ion exchangeable and damage resistant compositions (e.g., Corning Inc.® Gorilla Glass®) and inexpensive soda lime silicate compositions.

Reference will now be made in detail to embodiments that include a color-changing glass comprising $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Each of $Pr_2O_3$ and $Nd_2O_3$ may be set from about 0.065% to about 20 mole %. The glass can include one or more visibly fluorescent ions selected from oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. The fluorescence can be in the visible spectrum (e.g., $Tb^{3+}$ emits or otherwise fluoresces green light), thus facilitating consumer authentication, for example, in an anti-counterfeiting scheme, security apparatus or the like. The fluorescence can also be in the infrared spectrum (e.g., $Yb^{3+}$ emits or otherwise fluoresces light at 976 nm and 1060 nm), thus facilitating authentication, for example, by a consumer (e.g., to the extent possessing such infrared light-emitting equipment) or other authorized individual in an anti-counterfeiting scheme, security apparatus or the like, for example. Further, the glass can include no chromophores or at least one chromophore selected from $V_2O_5$, $Cr_2O_3$, MnO, $Mn_2O_3$, $Fe_2O_3$, CoO, $Co_3O_4$, NiO, CuO, $Nb_2O_5$, $CeO_2$, $Ho_2O_3$ and $Er_2O_3$, such that the sum of the chromophore(s) is less than 0.1 mole %. Various embodiments of color changing glasses will be described in more detail herein.

According to one embodiment, a color-changing glass is provided that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 1 and less than 1.9. Further, CoO, if present, is less than 0.01 mole % and $Fe_2O_3$, if present, is less than 0.004 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, the glass can optionally include at least one chromophore selected from the group consisting of $V_2O_5$, $Cr_2O_3$, MnO, $Mn_2O_3$, $Fe_2O_3$, CoO, $Co_3O_4$, CuO, NiO, CuO, $Nb_2O_5$, $CeO_2$, $Ho_2O_3$ and $Er_2O_3$, such that the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ is less than 0.1 mole %.

In another embodiment, a color-changing glass is provided that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Further, the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ chromophores in the glass, if any of these chromophores are present, is less than 0.1 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, an aspect of this glass includes at least one chromophore selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$.

In a further embodiment, a color-changing glass is provided that includes $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than or equal to 0.9 and less than or equal to 2.0. Further, $Ce_2O_3$, if present, is less than 1 mole %, $Fe_2O_3$, if present, is less than 0.4 mole %, $Mn_2O_3$, if present, is less than 0.04 mole %, $Er_2O_3$, if present, is less than 1 mole %, and $Nb_2O_5$, if present, is less than 0.5 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, the glass can optionally include at least one chromophore selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$, such that the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ is less than 0.1 mole %.

In an additional embodiment, a color-changing glass is provided that includes $SiO_2$ at greater than 70 mole %, along with $Pr_2O_3$ and $Nd_2O_3$ such that the sum of $Pr_2O_3$ and $Nd_2O_3$ is greater than 0.2 mole % and the ratio of $Nd_2O_3$ to $Pr_2O_3$ is greater than 0.5 and less than 3. Further, the sum of $Fe_2O_3$, $CeO_2$, and $TiO_2$, if any are present, is less than 1 mole %. To the extent that $Mn_2O_3$ and NiO are present in the glass, the sum of $Mn_2O_3$, $Fe_2O_3$, NiO and $CeO_2$ should be less than 2 mole %. The glass can optionally include one or more fluorescent ions selected from the group consisting of oxides of Yb, Cu, Sn, Mn, Ag, Sb, Ce, Sm, Eu, Tb, Dy, Tm, and combinations thereof, such that a total concentration of fluorescent ions is from greater than or equal to about 0.01 mole % to less than or equal to about 5.0 mole %. Further, the glass can optionally include at least one chromophore selected from the group consisting of $V_2O_5$, $Cr_2O_3$, MnO, $Mn_2O_3$, $Fe_2O_3$, CoO, $Co_3O_4$, NiO, CuO, $Nb_2O_5$, $CeO_2$, $Ho_2O_3$ and $Er_2O_3$, such that the sum of $V_2O_5$, $Cr_2O_3$, MnO, $Mn_2O_3$, $Fe_2O_3$, CoO, $Co_3O_4$, NiO, CuO, $Nb_2O_5$, $CeO_2$, $Ho_2O_3$ and $Er_2O_3$ is less than 0.1 mole %.

Embodiments of the glasses disclosed herein are directed to color-changing glasses, such as, for example, color-changing aluminosilicate glasses and color-changing alkali aluminosilicate glasses. The composition of the silicate glasses, according to embodiments, is outlined below; however, it should be understood that the composition of the glasses is not particularly limited to silicate glasses and that the chromophores and fluorescent compounds can be added to other types of glass-ceramics, polymers, single crystals, and glasses, including, without limitation, borate glasses, phosphate glasses, fluoride glasses, tellurate glasses, and aluminate glasses. In some embodiments, chalcogenide glasses, such as, for example, sulfide glasses, can be used. In other embodiments, any materials that are not strongly absorbing in the visible light spectrum can be used.

As used herein, "multichroic" relates to a capability of a glass to exhibit a shift in color upon illumination with different light sources that include a spectral change and/or an intensity change. As used herein, "metamerism" relates to a capability of a glass to exhibit a shift in color upon being subjected to, exposed to or otherwise illuminated with, a first and a second, illuminant. As used herein, the "Color Difference (CD)" or "color difference (CD)" shows the color difference between two different illuminants. The color difference (CD) is given by Equation (1):

$$CD = \sqrt{(L^*_1 - L^*_2)^2 + (a^*_1 - a^*_2)^2 + (b^*_1 - b^*_2)^2} \quad (1)$$

where $L^*_1$, $a^*_1$, $b^*_1$ are the CIELab* color coordinates (i.e., as adopted by the International Commission on Illumination in 1976) under the first illuminant (e.g., a D65 illuminant) and $L^*_2$, $a^*_2$, $b^*_2$ are the CIELab* color coordinates on the same sample under the second illuminant (e.g., an F02 illuminant). Further, all color difference (CD) measurements reported herein were obtained by measuring samples cut into 40×40 mm squares with a thickness of 2 mm and polished on both sides with cerium oxide polishing media. Color coordinates were then measured with a particular illuminant (e.g., F02 illuminant) in a reflectance mode through the thickness of each sample on an X-Rite Color i7™ Benchtop Spectrophotometer with a white backing substrate situated behind each sample.

Praseodymium- and Neodymium-Containing Glasses

In an exemplary silicate glass composition, $SiO_2$ is the largest constituent and, as such, $SiO_2$ is the primary constituent of the glass network formed from the glass composition. Pure $SiO_2$ has a relatively low coefficient of thermal expansion (CTE). However, pure $SiO_2$ has a high melting point. Accordingly, if the concentration of $SiO_2$ in the glass composition is too high, the formability of the glass composition can be diminished as higher concentrations of $SiO_2$ increase the difficulty of melting the glass, which, in turn, adversely impacts the formability of the glass. Low $SiO_2$ glasses, such as, for example, glass with less than 40 mole % $SiO_2$, tend to have poor durability and resistance to devitrification, so it is practical to have more than 40% $SiO_2$ and more than 50% $SiO_2$ for ease of forming. Glasses with at least 70 mole % $SiO_2$ have excellent durability and are suitable for exterior applications and installations. However, it should be understood that glasses that do not include silica can also be used in embodiments. For example, phosphate glasses, borate glasses, heavy metal fluoride, and other non-silica glasses could be used according to embodiments.

In embodiments, the glass composition can comprise $SiO_2$ in a concentration from greater than or equal to about 40 mole % to less than or equal to about 80 mole %, for example, from greater than or equal to about 50 mole % to less than or equal to about 75 mole %. In other embodiments, the glass composition can comprise $SiO_2$ in a concentration from greater than or equal to about 55 mole % to less than or equal to about 70 mole %, such as from greater than or equal to about 62 mole % to less than or equal to about 69 mole %. In further embodiments, the glass composition can comprise $SiO_2$ in a concentration from greater than or equal to 70 mole % (e.g., for added durability).

As discussed above, embodiments of the glass composition are directed to aluminosilicate glasses. Thus, the glass composition of embodiments can further comprise $Al_2O_3$ in addition to $SiO_2$. $Al_2O_3$ can serve as a glass network former, similar to $SiO_2$. $Al_2O_3$ can increase the viscosity of the glass composition due to its tetrahedral coordination in a glass melt formed from a properly designed glass composition. However, when the concentration of $Al_2O_3$ is balanced against the concentration of $SiO_2$ and, optionally, the concentration of alkali oxides in the glass composition, $Al_2O_3$ can reduce the liquidus temperature of the glass melt, thereby enhancing the liquidus viscosity and improving the compatibility of the glass composition with certain forming processes. The $Al_2O_3$ also serves as an aid to increase the solubility of rare earth dopants, particularly the Pr and Nd in the glass, along with other optional rare earth dopants such as Ho, Ce, Sm, Eu, Tb, Dy, and Tm. Thus, for glasses where shorter optical path lengths or thinner articles are desired, more of the combination of $Pr_2O_3$ and $Nd_2O_3$ is needed, so glasses with more than 1 mole % $Al_2O_3$ are desirable. For glasses with more than 10 mole % ($Pr_2O_3+Nd_2O_3$) it is desirable to have at least 10 mole % $Al_2O_3$. When the $Al_2O_3$ concentration exceeds 30 mole %, the liquidus temperature of the glass increases and the formability of the glass suffers. As such, it is generally desirable to employ less than 30 mole % $Al_2O_3$ for ease of forming the glass and less than 20 mole % $Al_2O_3$ for fabricating larger volumes of the glasses of the disclosure (e.g., in a manufacturing-scale operation). In pure $SiO_2$, rare earth oxide contents greater than 500-1000 ppm can result in phase separation or devitrification, but aluminosilicates can have up to 25 mole % rare earth oxide(s) and still be stable, e.g., as outlined in Hwa, L. G. et al., 39 Material Research Bulletin 33 (2004); and Clayden N. J. et al., 258 J. Non-Crystalline Solids 11 (1999), hereby incorporated by reference in their entirety. In addition, $Al_2O_3$ can enhance the ion exchange performance of alkali silicates. For chemically strengthened alkali aluminosilicate glasses, the $Al_2O_3$ content can be between 5 and 25 mole %.

In embodiments, the glass composition can comprise $Al_2O_3$ in a concentration from greater than or equal to about 5.0 mole % to less than or equal to about 25 mole %, such as from greater than or equal to about 7.0 mole % to less than or equal to about 17 mole %. In other embodiments, the glass composition can comprise $Al_2O_3$ in a concentration from greater than or equal to about 8.0 mole % to less than or equal to about 14 mole %, such as from greater than or equal to about 9.0 mole % to less than or equal to about 10 mole %. However, it should be understood that the glass system is not particularly limited and, thus, in some embodiments, glasses that contain from greater than or equal to about 25% to less than or equal to about 50% $Al_2O_3$ can be used. In other embodiments, the glass system can include no $Al_2O_3$.

$Na_2O$ is a component that can lower the viscosity of a glass to improve the meltability and the formability thereof. When the content of $Na_2O$ is too large, the coefficient of thermal expansion (CTE) of the glass becomes too large, and the thermal shock resistance of the glass can be lowered. Alkali oxides like $Li_2O$, $Na_2O$, $K_2O$, $Rb_2O$, and $Cs_2O$ can also enable ion exchange for modifying both the stress and refractive index profiles of the glass, which can enable chemical strengthening and writing of waveguides via ion exchange that can provide additional security features. For example, alkali-containing glasses can be ion exchanged in a bath containing $Ag^+$ ions such that the $Ag^+$ ions will exchange with the monovalent alkalis in the glass thereby incorporating $Ag^+$ ions into the glass. The $Ag^+$ ions incorporated into the glass will raise the refractive index of glasses containing one or more of $Li_2O$, $Na_2O$, $K_2O$ and $Rb_2O$ and also emit or otherwise fluoresce a green color when exposed to ultraviolet (UV) excitation light. The ion exchange can be patterned by masking portion(s) of the glass exposed to the bath containing $Ag^+$ ions to create patterns of $Ag^+$ waveguides or fluorescence. Alkali oxides do not add color to the glass and have a negligible effect on metamerism or fluorescence. In the case of glasses which serve as substrates for Si-based electronics, such as LCD displays, alkali ions, such as $Na^+$, can poison the Si transistors and degrade performance; consequently, for these applications, it can be desirable to have alkali-free compositions.

In embodiments, the glass composition can comprise $Na_2O$ in a concentration from greater than or equal to about 5 mole % to less than or equal to about 25 mole %, such as from greater than or equal to about 10 mole % to less than or equal to about 20 mole %. In other embodiments, the glass composition can comprise $Na_2O$ in a concentration from greater than or equal to about 11 mole % to less than or equal to about 17 mole %, such as from greater than or equal to about 12 mole % to less than or equal to about 15 mole %. In yet other embodiments, the glass composition can comprise $Na_2O$ in a concentration of about 14 mole %.

The glass composition can, in some embodiments, contain other elements, such as alkaline earth metal oxides. In embodiments, the alkaline earth metal oxides can be selected from MgO, CaO, SrO, BaO, and combinations thereof. These oxides can be added to increase meltability, durability, and glass stability. While ZnO is not an alkaline earth, it is a divalent oxide and serves a similar function as the above alkaline earth metal oxides and, thus, ZnO can be added to the glass composition. The alkaline earth metal oxides can be added as stabilizers that help prevent degradation of the glass composition upon exposure to environmental conditions. However, adding too much alkaline earth metal oxide to the glass composition can decrease its formability.

In embodiments, the glass composition comprises alkaline earth metal oxides in concentrations from greater than or equal to 0.0 mole % to less than or equal to about 25 mole %, such as from greater than or equal to about 2.0 mole % to less than or equal to about 20 mole %. In other embodiments, the glass composition comprises alkaline earth metal oxides in concentrations from greater than or equal to about 10 mole % to less than or equal to about 17 mole %, such as from greater than or equal to about 12 mole % to less than or equal to about 15 mole %.

In embodiments, the glass composition can comprise $B_2O_3$ (also referred herein as "boron oxide"). $B_2O_3$ softens the glass, can increase the solubility of rare earth dopants, and makes the glass easier to melt and form. However, at very high concentrations of $B_2O_3$, the glass durability suffers and can phase separate. Accordingly, it is preferable to maintain the $B_2O_3$ content below 25 mole %. $B_2O_3$ is also useful for lowering the coefficient of thermal expansion (CTE) and the liquidus temperature of the glass. In some embodiments, the glass composition can comprise $B_2O_3$ in concentrations from greater than or equal to 0.0 mole % (e.g., as including trace amounts or less) to less than or equal to about 25 mole %. In an implementation, the glass can include $B_2O_3$ in concentrations from greater than or equal to about 1.0 mole % to less than or equal to about 20 mole %. In other embodiments, the glass composition comprises $B_2O_3$ in concentrations from greater than or equal to about 1.5 mole % to less than or equal to about 10 mole %. For example, such glasses in certain embodiments can include a $B_2O_3$ concentration level from greater than or equal to about 7 mole % to less than or equal to about 17 mole %.

In embodiments, the glass composition can comprise fining agents, such as, for example, $SnO_2$, sulfates, chlorides, bromides, $Sb_2O_3$, $As_2O_3$, and $CeO_2$. At high concentrations, $CeO_2$ can impart color and overwhelm the multiple colors that would otherwise be exhibited by a glass intended to have a multichroic capability. Accordingly, the concentration of $CeO_2$ should be limited to less than 1 mole % for high concentrations of Pr and Nd in the glass, e.g., where the sum of $Pr_2O_3$ and $Nd_2O_3$ exceeds 5 mole %. For more intermediate concentrations of Pr and Nd in the glass, e.g., where the sum of $Pr_2O_3$ and $Nd_2O_3$ is between 1 and 5 mole %, the concentration of $CeO_2$ should be limited to less than 0.5 mole %. For lower concentrations of Pr and Nd in the glass, e.g., where the sum of $Pr_2O_3$ and $Nd_2O_3$ is less than 1 mole %, the concentration of $CeO_2$ should be limited to less than 0.1 mole %. Ce ions create the most color and absorption when there is a mixture of $Ce^{3+}$ and $Ce^{4+}$ ions in the glass, and the absorption intensity scales with the product of their concentrations; consequently, it is desirable to either strongly oxidize the glass containing Ce to maintain most, if not all, of the Ce in a $Ce^{4+}$ state or strongly reduce the glass to maintain most, if not all, of the Ce in a $Ce^{3+}$ state to minimize the masking effect of the Ce in the glass. The strongly reducing conditions also increase glue luminescence since $Ce^{3+}$ has a blue fluorescence while $Ce^{4+}$ does not. With regard to $SnO_2$, chlorides, bromides, $Sb_2O_3$ and $As_2O_3$, these fining agents do not impart much color to the glass, but their solubility limits their use to below about 1 mole % or less. However, $Sn^{2+}$ and $Sb^{3+}$ ions both fluoresce a bluish white color that can be combined with the multichroic effect of the glass of this disclosure (e.g., as pertaining to the Pr and Nd-related contributions) for additional anti-counterfeiting features, security features or the like. More generally, fining agents can be employed in the glasses of the disclosure at levels between about 0.05 to about 5 mole % to provide the fining function and, in certain instances, also provide fluorescence (e.g., for $Sn^{2+}$ and $Sb^{3+}$-containing fining agents). In a preferred aspect, $SnO_2$ is selected as a fining agent as it is not toxic (e.g., as compared to $Sb_2O_3$ and $As_2O_3$). In embodiments, the glass composition can comprise fining agents in concentrations from greater than or equal to 0.0 mole % to less than or equal to about 1.0 mole %, such as from greater than or equal to about 0.002 mole % to less than or equal to about 0.9 mole %. In other embodiments, the glass composition can comprise fining agents in concentrations from greater than or equal to about 0.05 mole % to less than or equal to about 0.8 mole %, such as from greater than or equal to about 0.1 mole % to less than or equal to about 0.7 mole %. In yet other embodiments, the glass composition can comprise fining agents in concentrations from greater than or equal to about 0.1 mole % to less than or equal to about 0.3 mole %, such as about 0.15 mole %. In embodiments that use sulfates as the fining agents, the sulfates can be included in amounts from greater than or equal to about 0.001 mole % to less than or equal to about 0.1 mole %. It should be noted that, as discussed below, embodiments may also include $Sn^{2+}$ as fluorescent ions. Therefore, in embodiments, $SnO_2$ will not be used as a fining agent so that it does not interfere with the fluorescent properties of the glass. Additionally, in embodiments where Sn ions are used as fluorescents, the concentration of Sn ions can be balanced with other fining agents.

In addition to the above silicate glass components, glass compositions according to embodiments described herein further comprise $Pr_2O_3$ and $Nd_2O_3$. The addition of a combination of $Pr_2O_3$ and $Nd_2O_3$ adds color and a color-changing capability to the glass composition. In these glasses, the sum of $Pr_2O_3$ and $Nd_2O_3$ is greater than 0.2 mole % and the ratio of $Nd_2O_3$ to $Pr_2O_3$ is greater than 0.5 and less than 3 to achieve a color-changing capability. Each of $Pr_2O_3$ and $Nd_2O_3$ may be set from about 0.065% to about 20 mole %. At these levels of $Pr_2O_3$ and $Nd_2O_3$, these glasses exhibit a pink color when observed in daylight, incandescent or full spectrum white light. When observed under a typical fluorescent light source (e.g., with sharp emission bands at about 545 nm and 620 nm), these glasses exhibit a green color. Further, when illuminated with an LED flashlight or LED lighting fixture (e.g., blue LED with Ce:YAG yellow phosphor), these glasses appear yellow. Hence, these glasses are multichroic, capable of changing from pink-to-green-to-yellow or changing in other sequences of pink, green and yellow, depending on the illumination conditions (e.g., spectra of the light source illuminating them).

In another preferred aspect, a large color shift can be observed in glasses of the disclosure with the $Nd_2O_3/Pr_2O_3$ ratio between 0.75 and 2.0. Other aspects of the disclosure are directed to glass compositions with the $Nd_2O_3/Pr_2O_3$ ratio between 1 and 1.9. Another aspect of the disclosure is directed to glass composition with the $Nd_2O_3/Pr_2O_3$ ratio set at greater than or equal to 0.9 and less than or equal to 2.0. Even more dramatic color changes are possible in some embodiments of these glasses in which the $Nd_2O_3/Pr_2O_3$ ratio is between 1.1 and 1.5.

When the $Nd_2O_3/Pr_2O_3$ ratio is less than 0.5, the green $Pr_2O_3$ color dominates and these color changes are weakly observed. Conversely, when the $Nd_2O_3/Pr_2O_3$ ratio is greater than 4, the purple $Nd_2O_3$ color dominates and the color changes are weakly observed. As such, the $Nd_2O_3/Pr_2O_3$ ratio should be generally controlled within 0.5 to 4 to ensure that the glass exhibits a significant multichroic, color-changing capability. Accordingly, in certain implementations of the glasses of the disclosure, the $Nd_2O_3/Pr_2O_3$ ratio can be set at 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0 and all ratios between these examples.

In certain preferred implementations, the $Pr_2O_3$ can range from about 0.7 to about 3 mole % and the $Nd_2O_3$ can range from about 1.0 to about 4 mole %, to obtain a color-changing effect. For example, the $Pr_2O_3$ can be set at 0.5 mole %, 0.6 mole %, 0.7 mole %, 0.8 mole %, 0.9 mole %, 1.0 mole %, 1.1 mole %, 1.2 mole %, 1.3 mole %, 1.4 mole %, 1.5 mole %, 1.6 mole %, 1.7 mole %, 1.8 mole %, 1.9 mole %, 2.0 mole %, 2.1 mole %, 2.2 mole %, 2.3 mole %, 2.4 mole %, 2.5 mole %, 2.6 mole %, 2.7 mole %, 2.8 mole %, 2.9 mole %, 3.0 mole %, and all values between these amounts. Similarly, the $Nd_2O_3$ can be set at, for example, 1.0 mole %, 1.1 mole %, 1.2 mole %, 1.3 mole %, 1.4 mole %, 1.5 mole %, 1.6 mole %, 1.7 mole %, 1.8 mole %, 1.9 mole %, 2.0 mole %, 2.1 mole %, 2.2 mole %, 2.3 mole %, 2.4 mole %, 2.5 mole %, 2.6 mole %, 2.7 mole %, 2.8 mole %, 2.9 mole %, 3.0 mole %, 3.1 mole %, 3.2 mole %, 3.3 mole %, 3.4 mole %, 3.5 mole %, 3.6 mole %, 3.7 mole %, 3.8 mole %, 3.9 mole %, 4.0 mole %, and all values between these amounts. In an additional preferred aspect, the $Pr_2O_3$ can range from about 0.5 mole % to about 1 mole % and the $Nd_2O_3$ can range from about 1 mole % to about 2 mole % to obtain a strong, color-changing effect. Still further, other aspects of the glasses in the disclosure can include $Pr_2O_3$ levels above 3 mole % and $Nd_2O_3$ levels above 4 mole %. These higher levels of $Pr_2O_3$ above 3 mole % and $Nd_2O_3$ above 4 mole % are particularly suited for thin glasses and glass articles in which the costs of the Pr and Nd additives can be limited. These higher levels of $Pr_2O_3$ above 3 mole % and $Nd_2O_3$ above 4 mole % are also suited for thin glasses given that the intensity of color is a function of the dopant level and the thickness of the glass article. As such, thinner glass articles require increasingly higher concentrations of dopants to achieve the same color intensity levels of thicker glass articles. From a practical standpoint, the total concentration of $Pr_2O_3$ and $Nd_2O_3$ can be limited to about 50 mole %, (e.g., within thin glass articles), as higher levels of rare earth oxides in the glass can make the glass unstable and prone to crystallization.

Pure Nd- & Pr-doped glasses can change in appearance from pink to green with a change in illumination from incandescent or daylight (i.e., a D65 standard illuminant) to fluorescent light (i.e., an F02 standard illuminant). Certain aspects of these glasses with the $Nd_2O_3/Pr_2O_3$ ratio at about 1.222 exhibit a color difference (CD) of 8.8 with a change in illumination from incandescent or daylight to fluorescent light (see, e.g., Ex. 1 in Tables 1 and 2). Thus, doping a glass with praseodymium and neodymium creates a color change when the type of light the glass is subjected to, exposed to or otherwise illuminated by, is changed. However, the colors observed when using pure Nd and Pr ions in combination is limited based on changes to the concentration of Nd and Pr. For example, if the glass is used in anti-counterfeiting measures, the color shift of the glass could be replicated, for example, by counterfeiters.

According to embodiments, to customize the color shift in Pr- and Nd-containing silicate glasses, various chromophores can be added to the glass composition. The chromophores can be selected from ions of V, Cr, Mn, Fe, Ho, Co, Ni, Nb, Cu, Se, Bi, Er, Yb, and combinations thereof. In embodiments, the ions of the above chromophores can be present as oxides. Each of these chromophores can be used to impart a unique color shift when the light exposure is changed from incandescent to fluorescent. For example, when $Co_3O_4$ is added at about 0.0015 mole % to the Pr- and Nd-containing silicate glass, the color shift of the glass is from violet to emerald when the incident light (illuminant) is changed from incandescent to fluorescent light. When $Co_3O_4$ is added at about 0.003 mole % to the Pr- and Nd-containing silicate glass, the color shift of the glass is from blue to teal when the incident light is changed from incandescent to fluorescent light.

While one or more chromophores can be added to the Pr- and Nd-containing glasses of the disclosure, certain embodiments require some consideration be given to ensuring that the metamerism associated with the $Nd_2O_3/Pr_2O_3$ ratio and overall content is not overwhelmed by the chromophore dopant(s). For example, $Co_3O_4$ has a very stable blue color, and including too much $Co_3O_4$ in the glass composition will result in a glass that is blue under any light source. More particularly, $Co_3O_4$ at 0.01 mole % or greater can overwhelm the pink-green-yellow hues of the Pr- and Nd-containing glasses of the disclosure, resulting in only a blue color independent of the illumination source. Accordingly, embodiments employing $Co_3O_4$ (or CoO) as a chromophore in the glass should limit $Co_3O_4$ (and CoO) to less than 0.01 mole %. Other embodiments should limit $Co_3O_4$ (and CoO) to less than $0.01*(Nd_2O_3+Pr_2O_3)$ in mole %. While $Nb_2O_5$ is typically not considered as a chromophore, it usually imparts a greenish color in high concentrations due to reduced Nb species and contaminants. Additionally, $Nb_2O_5$ is expensive and increases the density of the glass. Thus, it is desirable to control the $Nb_2O_5$ content below 1 mole %, more preferably below 0.5 mole %, and most preferably less than 0.25 mole % to prevent the muddy green color imparted by $Nb_2O_5$ from overwhelming or masking the colors observed from the otherwise multichroic nature of the glasses of the disclosure. Additional glass embodiments of the disclosure include $Mn_2O_3$ at less than 0.04 mole %. Still further, other embodiments of the disclosure include one or more chromophores selected from the group $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ such that the sum of the chromophores included in the glass is less than 0.1 mole % or, more preferably, less than 0.05 mole %. Inclusion of larger concentrations of any of these chromophores, alone or in combination with each other, may affect the metamerism of the Pr- and Nd-containing glasses of the disclosure.

In embodiments, the glass composition can comprise chromophores in concentrations from greater than or equal to 0.001 mole % to less than or equal to about 1.5 mole %, such as from greater than or equal to about 0.01 mole % to less than or equal to about 1.0 mole %. In other embodiments, the glass composition can comprise chromophores in concentrations from greater than or equal to about 0.1 mole % to less than or equal to about 0.8 mole %, such as from greater than or equal to about 0.15 mole % to less than or equal to about 0.6 mole %. In yet other embodiments, the glass composition can comprise chromophores in concentrations from greater than or equal to about 0.2 mole % to less than or equal to about 0.5 mole %. In embodiments, the concentration of the secondary chromophores can be less than or equal to the $Pr_2O_3$ and $Nd_2O_3$ concentrations to avoid overwhelming the metamerism of the Pr- and Nd-containing glass. In other embodiments, the concentration of the secondary chromophores can be less than or equal to one tenth of the $Pr_2O_3$ and $Nd_2O_3$ concentrations to avoid overwhelming the metamerism of the Pr- and Nd-containing glass. In preferred embodiments, the concentration of the secondary chromophores can be less than or equal to one hundredth of the $Pr_2O_3$ and $Nd_2O_3$ concentrations to avoid overwhelming the metamerism of the Pr- and Nd-containing glass.

In addition to transition metal ion chromophores, embodiments of the glass compositions can comprise rare earth ions as colorants, which can be present as rare earth oxides in embodiments. In embodiments, ions of Ce and Er can be added to the glass composition as rare earth ion colorants. In embodiments, the glass composition comprises rare earth ions in concentrations from greater than or equal to about 0.01 mole % to less than or equal to about 5.0 mole %, such as from greater than or equal to about 0.05 mole % to less than or equal to about 2.0 mole %. In other embodiments, the glass composition includes $Ce_2O_3$ at a concentration of less than 1 mole %. In another embodiment, the glass composition includes $Er_2O_3$ at a concentration of less than 1 mole %. Rare earth ions are weaker colorants than the transition metal ions and, thus, in embodiments, higher concentrations or rare earth ions can be needed.

In embodiments, the glass composition can comprise $SiO_2$ in a concentration from greater than or equal to about 40 mole % to less than or equal to about 80 mole %, such as from greater than or equal to about 50 mole % to less than or equal to about 75 mole %. In other embodiments, the glass composition can comprise $SiO_2$ in a concentration from greater than or equal to about 55 mole % to less than or equal to about 70 mole %, such as from greater than or equal to about 62 mole % to less than or equal to about 69 mole %.

As discussed above, embodiments of the glass composition are directed to aluminosilicate glasses. Thus, the glass composition can comprise $Al_2O_3$ in a concentration from greater than or equal to about 5.0 mole % to less than or equal to about 25 mole %, such as from greater than or equal to about 7.0 mole % to less than or equal to about 17 mole %. In other embodiments, the glass composition can comprise $Al_2O_3$ in a concentration from greater than or equal to about 8.0 mole % to less than or equal to about 14 mole %, such as from greater than or equal to about 9.0 mole % to less than or equal to about 10 mole %. However, it should be understood that the glass system is not particularly limited and, thus, in some embodiments, glasses that contain from greater than or equal to about 25% to less than or equal to about 50% $Al_2O_3$ can be used. In other embodiments, the glass system can include no $Al_2O_3$.

In embodiments, the glass composition can comprise $Na_2O$ in a concentration from greater than or equal to about 5 mole % to less than or equal to about 25 mole %, such as from greater than or equal to about 10 mole % to less than or equal to about 20 mole %. In other embodiments, the glass composition can comprise $Na_2O$ in a concentration from greater than or equal to about 11 mole % to less than or equal to about 17 mole %, such as from greater than or equal to about 12 mole % to less than or equal to about 15 mole %. In yet other embodiments, the glass composition can comprise $Na_2O$ in a concentration of about 14 mole %.

In addition to $Na_2O$ other alkali metal oxides can be included in the glass composition. In embodiments, the glass composition can include $Li_2O$ and/or $K_2O$. In some embodiments, the concentration of the additional alkali metal oxides can be the same as the concentration of $Na_2O$ in the glass composition. In other embodiments, the concentration of the additional alkali metal oxides can be different from the concentration of $Na_2O$ in the glass composition. However, in embodiments, the total concentration of alkali metal oxides in the glass composition can be less than or equal to about 18 mole %, such as less than or equal to about 16 mole %. In embodiment, the total concentration of alkali metal oxides in the glass composition can be less than or equal to about 14 mole %, such as less than or equal to about 12 mole %.

In embodiments, the glass composition can comprise $Li_2O$ and/or $K_2O$ in a concentration from greater than or equal to about 2.0 mole % to less than or equal to about 10 mole %, such as from greater than or equal to about 4.0 mole % to less than or equal to about 8.0 mole %. In other embodiments, the glass composition can comprise $Li_2O$ and/or $K_2O$ in a concentration from greater than or equal to about 6.0 mole % to less than or equal to about 7.0 mole %.

The glass composition can, in some embodiments, contain other elements, such as alkaline earth metal oxides. In embodiments, the alkaline earth metal oxides can be selected from MgO, CaO, SrO, BaO, ZnO (which acts similarly to alkaline earth metal oxides), and combinations thereof. In embodiments, concentrations of alkaline earth metal oxides can be from greater than or equal to 0.0 mole % to less than or equal to about 25 mole %, such as from greater than or equal to about 2.0 mole % to less than or equal to about 20 mole %. In other embodiments, the glass composition comprises alkaline earth metal oxides in concentrations from greater than or equal to about 10 mole % to less than or equal to about 17 mole %, such as from greater than or equal to about 12 mole % to less than or equal to about 15 mole %.

In embodiments, the glass composition comprises each alkaline earth metal oxide in concentrations from greater than or equal to 0.0 mole % to less than or equal to about 9.0 mole %, such as from greater than or equal to about 2.0 mole % to less than or equal to about 8.0 mole %. In other embodiments, the glass composition comprises alkaline earth metal oxides in concentrations from greater than or equal to about 3.0 mole % to less than or equal to about 7.0 mole %, such as from greater than or equal to about 4.0 mole % to less than or equal to about 6.0 mole %. In yet other embodiments, the glass composition comprises alkaline earth metal oxides in concentrations of about 5.0 mole %.

Fluorescent Glasses

Embodiments of the glass composition can include fluorescent ions. In some embodiments, the fluorescent ions are used in place of the chromophores. However, in other embodiments, the fluorescent ions are present in addition to the chromophores. In embodiments, the fluorescent ions can be selected from ions of Cu, Sn, Mn, Sb, Ag, Ce, Sm, Eu, Tb, Dy, Tm, and combinations thereof. In embodiments, the fluorescent ions can be present as oxides.

Using fluorescent ions allows the glass composition to emit different colors of visible light when the glass is excited with certain wavelengths of light. Fluorescent ions can be added to the Pr- and Nd-containing glasses of the disclosure without imparting any visible color, and yet enable the glass to fluoresce under UV light-induced excitation. In embodiments, the color of the fluorescent ion can emit one color when excited with light of a first wavelength (365 nm, for example) and it can emit a second color when excited with light at a second wavelength (405 nm, for example). For example, $Eu^{3+}$ doped glass and $Tb^{3+}$ doped glass, whether Pr- and Nd-containing or not, emits red light and green light, respectively, when exposed to 365 nm light.

In embodiments, the glass composition can comprise fluorescent ions in concentrations from greater than or equal to 0.01 mole % to less than or equal to about 5.0 mole %, such as from greater than or equal to about 0.05 mole % to less than or equal to about 2.0 mole %. In other embodiments, the glass composition can comprise fluorescent ions in concentrations from greater than or equal to about 0.1 mole % to less than or equal to about 1.0 mole %, such as from greater than or equal to about 0.15 mole % to less than or equal to about 0.6 mole %. In yet other embodiments, the glass composition can comprise fluorescent ions in concentrations from greater than or equal to about 0.2 mole % to less than or equal to about 0.5 mole %.

Multi-Fluorescent Glasses

Embodiments of the glass composition can include two or more different fluorescent ions. In embodiments, the fluorescent ions can be selected from Cu, Sn, Mn, Sb, Ce, Sm, Eu, Tb, Tm, Sm, Dy, and combinations thereof. In embodiments, the fluorescent ions can be present as oxides. Using multiple fluorescent ions allows the glass composition to emit different colors of visible light when the glass is excited with certain wavelengths of light. In embodiments, the glass composition can fluoresce a first color at a first wavelength that is from greater than or equal to about 300 nm to less than or equal to about 400 nm, such as from greater than or equal to about 310 nm to less than or equal to about 390 nm. The glass composition can fluoresce a second color at a second wavelength that is from greater than or equal to about 400 nm to less than or equal to about 475 nm, such as from greater than or equal to about 410 nm to less than or equal to about 465 nm. The glass composition can fluoresce a third color at a third wavelength that is from greater than or equal to about 475 nm to less than or equal to about 500 nm, such as from greater than or equal to about 480 nm to less than or equal to about 495 nm.

For example, in embodiments, the color of the fluorescent ion can emit one color when excited with light of a first wavelength (365 nm, for example), it can emit a second color when excited with light at a second wavelength (405 nm, for example), and it can emit a third color when excited with light at a third wavelength (488 nm, for example). For example, embodiments can include glasses comprising oxides of Eu and oxides of Tb as its fluorescent ions. $Eu^{3+}$ doped glasses generally emit red when excited with the proper wavelength of light, and $Tb^{3+}$ doped glasses generally emit green when excited with the proper wavelength of light. However, when Eu oxides and Tb oxides are combined in a glass composition, the glass composition can emit light that is red, green, orange, yellow, or a combination of those colors upon being excited by light having a wavelength of 365 nm, with the exact color depending on the proportional mixture of $Eu^{3+}$ and $Tb^{3+}$ ions in the glass. However, when the glass is excited with light at a 405 nm wavelength, only the $Eu^{3+}$ is excited and red light is emitted, and when the glass is excited with 488 nm light, only the $Tb^{3+}$ is excited and green light is emitted when the $Eu^{3+}$ concentration is sufficiently low to prevent energy transfer from $Tb^{3+}$ to $Eu^{3+}$. The $Eu_2O_3$ content in the glass should be less than about 0.1 mole % to prevent energy transfer, and preferably less than 0.05 mole %. Accordingly, embodiments of the glass can be configured to emit three distinct colors depending on the wavelength of the light used to excite the glass composition. If the glass is melted in slightly reducing conditions, some or all of the $Eu^{3+}$ can be reduced to $Eu^{2+}$ which emits blue light when excited at wavelengths below 400 nm. Such a glass co-doped with $Tb^{3+}$ will emit white ($Eu^{2+}$, $Eu^{3+}$, and $Tb^{3+}$ emission) light when excited at wavelengths of about 365 nm, purple ($Eu^{2+}$ and $Eu^{3+}$ emission) when excited at wavelengths of about 394 nm, blue ($Eu^{2+}$ emission, only) when excited at wavelengths of about 310 or about 330 nm, aqua ($Eu^{2+}$ and $Tb^{3+}$ emission) when excited at wavelengths of about 342 nm, green ($Tb^{3+}$ emission only) when excited at wavelengths of about 484 nm, and red ($Eu^{3+}$ emission only) when excited at wavelengths of about 464 nm.

Some fluorescent ions can cross relax or quench each other, so the selection and concentration of each ion has to be engineered to ensure both ions are emitting. For example, when the concentration of $Eu_2O_3$ exceeds about 2 mole %, in a $Tb^{3+}$ emitting glass, most of the excited $Tb^{3+}$ ions can transfer their energy to neighboring $Eu^{3+}$ ions and only the red emission of the $Eu^{3+}$ ion can be left even if the excitation wavelength only excites the $Tb^{3+}$ ion. This energy transfer mechanism can also be used to sensitize a fluorescent ion to increase the effective absorption of pump energy. As another example, the inclusion of a $CeO_2$ dopant should be balanced against $Eu_2O_3$ and $Tb_2O_3$, if present. Since the $Ce^{4+}$ ion is an allowed f-d transition while the other rare earth elements are exemplified by forbidden f-f transitions, the $Ce^{4+}$ f-d transition is orders of magnitude stronger than those of other rare earth elements. Thus, the $CeO_2$ content should not exceed the content of $Eu_2O_3$ and that of $Tb_2O_3$, if either are present, otherwise the blue emission of the $Ce_2O_3$ will overwhelm the weaker red $Eu^{3+}$ and green of the $Tb^{3+}$ ions.

In embodiments, the glass composition can comprise two or more fluorescent ions in concentrations from greater than or equal to 0.01 mole % to less than or equal to about 5 mole %, such as from greater than or equal to about 0.05 mole % to less than or equal to about 2.0 mole %. In other embodiments, the glass composition can comprise two or more fluorescent ions in concentrations from greater than or equal to about 0.1 mole % to less than or equal to about 1 mole %, such as from greater than or equal to about 0.15 mole % to less than or equal to about 0.6 mole %. In yet other embodiments, the glass composition can comprise two or more fluorescent ions in concentrations from greater than or equal to about 0.2 mole % to less than or equal to about 0.5 mole %.

In addition to fluorescent ions, embodiments of the glass compositions can comprise rare earth ions as colorants. In embodiments, the rare earth ions can be present as rare earth oxides. In embodiments, ions of Er and Ce can be added to the glass composition as rare earth ion colorants. In embodiments, the ions of Er and Ce can be present in the glass as oxides. In embodiments, the concentration of rare earth ion in the glass composition can be less than the concentration of fluorescent ions in the glass composition. In some embodiments, the concentration of $Ce_2O_3$ in the glass composition is less than the concentration of fluorescent ions in the glass composition.

The multi-fluorescent glasses can also be doped with transition metal ions to impart color in addition to the multi-fluorescent effect. If the glass is strongly absorbing near the fluorescence wavelength, then the fluorescence will be absorbed or quenched. To avoid fluorescence quenching, the concentration of these dopants should be kept below 0.5 mole % and for strong chromophores like $Co^{2+}$ and $Ni^{2+}$ ions, below 0.1 mole %. In cases where the absorption of the chromophores overlaps the fluorescence (such as the case where the red emission of $Eu^{3+}$ would be annihilated by the red absorption of the $Co^{2+}$), the chromophore concentration should be below 0.02 mole %.

In embodiments, the glass composition comprises rare earth ions in concentrations from greater than or equal to about 0.1 mole % to less than or equal to about 10 mole %, such as from greater than or equal to about 0.2 mole % to less than or equal to about 7.0 mole %. In other embodiments, the glass composition comprises rare earth ions in concentrations from greater than or equal to about 0.3 mole % to less than or equal to about 5.0 mole %, such as from greater than or equal to about 0.4 mole % to less than or equal to about 3.0 mole %. In yet other embodiments, the glass composition comprises rare earth ions in concentrations from greater than or equal to about 0.5 mole % to less than or equal to about 2.0 mole %, such as from greater than or equal to about 0.8 mole % to less than or equal to about 1.0 mole %.

Color-changing glasses according to embodiments may be used in many different applications. For example, glasses that change color can be used as aesthetic embellishments on, for example, clothing, electronics (e.g., cell phone backs and cases), and packaging (e.g., perfume bottles). These color-changing glasses can also be employed in artwork that changes color depending on the lighting conditions. Small energy efficient LEDs can be included in the device, packaging, art work, sculpture and other products and forms that incorporate these glasses to ensure that the fluorescent and/or absorptive color(s) of these glasses can be changed by illuminating the glass composition with light of differing wavelengths. Color-tunable white LEDs that consist of individually addressable red, green and blue LEDs can be augmented with a UV LED and a broad-band phosphor LED so that the color can be changed by these LEDs, or embedded in the base or edges of the glass for stunning and amazing color visual effects. Waveguides can also be embedded into the glass for even more complex visual effects where the light sources themselves are out of view.

Further, color-changing glasses can be used as anti-counterfeiting systems. For example, glasses according to embodiments can be formed to have a first customized color in broad spectrum white light and a second customized color in fluorescent light, or a glass can be formed to fluoresce customized colors by using different fluorescent ions. In this way it can be easy to detect whether a good is counterfeit by simply observing the color of the glass in different sources of white light.

It should now be understood that glass compositions described herein are color-changing glasses that include praseodymium and neodymium, chromophore(s) and/or fluorescent ion(s). Preferably, these glasses include praseodymium and neodymium, and optionally contain chromophore(s) and/or fluorescent ion(s). The various combinations of one or more of praseodymium and neodymium; chromophore(s); and fluorescent ion(s) allow the color of the glass to be customizable and changeable depending on the lighting exposure. The customizable and changeable color allows the glass to be used as decorative glass and as an anti-counterfeiting scheme. For example, a glass can include $Eu^{2+}$ and $Tb^{3+}$ ions so that the glass emits blue ($Eu^{2+}$ emission, only) when excited at wavelengths of about 310 or about 330 nm, aqua ($Eu^{2+}$ and $Tb^{3+}$ emission) when excited at wavelengths of about 342 nm, green ($Tb^{3+}$ emission only) when excited at wavelengths of about 484 nm. This glass can then be exposed to these different wavelengths of light and if it does not fluoresce properly, it can be determined that the good is counterfeit. Using this anti-counterfeiting system, counterfeit goods can easily and quickly be detected. In contrast, many known anti-counterfeiting schemes have been developed that use secretive, expensive "black box" sensors to indicate whether a good is genuine or counterfeit. However, many of these anti-counterfeiting schemes require specialized equipment, which is generally not available to consumers, to determine whether a good is genuine or counterfeit. There is also a problem with counterfeit "black boxes" that falsely indicate a product is genuine. Further, the anti-counterfeit schemes often cannot be incorporated into the article in an aesthetically pleasing manner.

In addition to being added as aesthetic embellishments, glasses according to embodiments may be used as bottles and containers for goods. For example, perfumes, colognes, liqueurs, medicines, and electronics are frequently counterfeited and, thus, the containers for these goods can be made from color-changing glasses, according to embodiments disclosed herein. To meet these various uses, glasses, according to embodiments, may be formed into articles such as bottles and glass sheets by any suitable glass forming method. For example, color-changing glass bottles may be made in numerous shapes and sizes by glass forming methods including, for example, blow molding, punch molding, punch and blow molding, and other suitable molding processes. Color-changing glasses, according to some embodiments, may be formed into glass sheets that may be applied, for example, to electronics by methods such as, for example, floating or fusion drawing as disclosed in U.S. Pat. Nos. 3,338,696 and 3,682,609, which are herein incorporated by reference in its entireties.

In some embodiments, glasses disclosed herein can be subjected to physical or chemical strengthening. For example, the glasses can be tempered by heat treatments or strengthened by ion exchange. In an ion-exchange process, the glass may be exposed to an alkali ion containing solution, such as, for example, $KNO_3$ or $NaNO_3$. Upon exposure to the alkali ion containing solution, smaller alkali ions in the glass, such as, for example, Li and Na ions, are exchanged with larger ions, such as, for example, Na and K. This ion exchange reinforces the glass matrix and can strengthen the glass. In certain implementations, the strengthening results in the development of a compressive stress region with a maximum compressive stress (typically at one or more primary surfaces of the glass) of at least 50 MPa that spans a depth within the glass (referred herein as a "depth of layer" or "DOL"). Typical DOL levels are at least 15 microns in thickness. Suitable ion exchange methods are disclosed in U.S. Pat. No. 5,674,790, which is herein incorporated by reference in its entirety. In addition to strengthening the glasses, the strengthening process can make the glass compositions frangible so that if the glass is tampered with it will shatter. In anti-counterfeiting systems, the frangibility of the glass is a beneficial anti-tampering element.

EXAMPLES

Embodiments will be further clarified by the following examples which are intended to be non-restrictive and illustrative only.

Example 1

Praseodymium- and Neodymium-Containing Glasses

Glass compositions having the compositions disclosed in Tables 1 and 2 below were prepared by mixing 1 kg batches of sand, aluminum oxide, sodium sulfate, potassium nitrate, magnesium oxide, calcium carbonate, barium carbonate, zinc oxide, borax, praseodymium oxide, and neodymium oxide, along with cobalt oxide for certain examples. The batches were then loaded in a platinum crucible, and melted for 5 hours at 1325° C. and then poured into a bucket of water to make a cullet. The cullet was then crushed and re-melted for 6 hours at 1475° C. to homogenize the glass. The melts were then poured onto a steel table, and annealed at 550° C. for 2 hours before cooling to room temperature. The resulting glass patties were cut into glass samples, which were then polished for purposes of color determinations and color coordinate measurements. In particular, the glass samples were polished to smooth their exterior surfaces, thus improving optical quality and reducing scattering of light passing through the thickness of the samples during color coordinate measurements. As understood by those with ordinary skill in the field of the disclosure, polishing times and conditions were varied based on the size of the samples for purposes of making color determinations and color coordinate measurements.

Examples 1-7 ("Exs. 1-7") in Table 1 are directed to glasses comprising praseodymium and neodymium that appear according to embodiments disclosed herein. In these examples, the praseodymium levels ranged from 0.7 mole % to 0.9 mole % and the neodymium levels ranged from 1.1 mole % to 1.3 mole %. Further, the ratios of praseodymium to neodymium ranged from 1.222 (Exs. 1, 7) to 1.857 (Ex. 5). All of these examples are multichroic glasses that exhibit metamerism. In particular, each of them appears pink upon exposure to incandescent or daylight, green upon exposure to fluorescent light and yellow upon exposure to LED light. For example, Ex. 1 is green under fluorescent light with nearly the same color as a glass doped with $Pr^{3+}$ ions alone without $Nd^{3+}$ ions. Yet the true color of the glass in Ex. 1 in daylight, incandescent or full spectrum white light is pink. Further, under LED illumination, such as modern low energy consumption fixtures or LED flashlights, the glass appears yellow.

Examples 8-11 ("Exs. 8-11") in Table 1 are directed to glasses comprising praseodymium and neodymium and at least one chromophore (e.g., $Co_3O_4$) according to embodiments disclosed herein. Ex. 8-11 in Table 1 show that even though the $Pr_2O_3$ concentration is 0.7 to 0.8 mole %, the $Nd_2O_3$ concentration is 1.2 to 1.3 mole % and the $Co_3O_4$ concentration ranges from 0.0029 to 0.0133 mole %, the metamerism comes through and the samples appear violet, blue, blue or purple in incandescent or full spectrum white light, and emerald, teal, greenish blue or green in fluorescent light, respectively. Hence, maintaining the CoO to concentration levels below 0.015 mole % (or, alternatively, C0304 to concentration levels below 0.01 mole %) ensures that these praseodymium- and neodymium-containing glasses retain metamerism after being doped with a chromophore.

Table 2 shows the corresponding color coordinates in L*, a*, b* space as a function of standard illumination conditions for Ex. 1, as measured through the thickness of the sample (a 40×40 mm square test coupon with a thickness provided below) in reflectance mode on an X-Rite Color i7™ Benchtop Spectrophotometer with a white backing substrate situated behind the sample. D65 is natural daylight, F-02 is fluorescent light, and A-10 corresponds to incandescent light. The reported color difference (CD) data was obtained using Equation (1). There are substantial shifts in the color coordinates between the full spectrum white light and fluorescent illuminants. Notably, the F02 to A10 (i.e., "CD (F02-A10)" as shown in Table 2) sequence shows the greatest color difference (CD) for this glass at 17.53.

oxide, loading them in a platinum crucible, and melting for 6 hours at 1475° C. The melts were then poured onto a steel table, and then annealed at 530° C. for 2 hours before cooling to room temperature. The resulting glass patties were cut into glass samples, which were then polished for purposes of color determinations. In particular, the glass samples were polished to smooth their exterior surfaces, thus improving optical quality. As understood by those with ordinary skill in the field of the disclosure, polishing times and conditions were varied based on the size of the samples for purposes of making color determinations.

In particular, Examples 12-18 in Table 3 are directed to glasses comprising multiple fluorescent ions according to embodiments disclosed herein, without the presence of praseodymium and neodymium. As such, they are clear unless exposed to certain ultraviolet wavelengths (e.g., 365

TABLE 1

Praseodymium- and Neodymium-Containing Glasses

| Glass | Composition (mole %) | | | | | | | | | | | | | Absorptive Color Illumination | |
|---|---|---|---|---|---|---|---|---|---|---|---|---|---|---|---|
| | $SiO_2$ | $Al_2O_3$ | $Na_2O$ | $K_2O$ | MgO | CaO | BaO | ZnO | $B_2O_3$ | $Nd_2O_3$ | $Pr_2O_3$ | Nd:Pr | CoO | Incandescent | Fluorescent |
| Ex. 1 | 71.1 | 1.09 | 16.13 | 0.39 | 0.11 | 5.87 | 0.95 | 0.78 | 1.56 | 1.081 | 0.884 | 1.222 | 0 | Pink | Green |
| Ex. 2 | 71.1 | 1.09 | 16.13 | 0.39 | 0.11 | 5.87 | 0.95 | 0.78 | 1.56 | 1.179 | 0.786 | 1.5 | 0 | Pink | Green |
| Ex. 3 | 71.1 | 1.09 | 16.13 | 0.39 | 0.11 | 5.87 | 0.95 | 0.78 | 1.56 | 1.081 | 0.884 | 1.222 | 0 | Pink | Green |
| Ex. 4 | 71.1 | 1.09 | 16.13 | 0.39 | 0.11 | 5.87 | 0.95 | 0.78 | 1.56 | 1.179 | 0.750 | 1.573 | 0 | Pink | Green |
| Ex. 5 | 71.1 | 1.09 | 16.13 | 0.39 | 0.11 | 5.87 | 0.95 | 0.78 | 1.56 | 1.277 | 0.688 | 1.857 | 0 | Pink | Green |
| Ex. 6 | 71.1 | 1.09 | 16.13 | 0.39 | 0.11 | 5.87 | 0.95 | 0.78 | 1.56 | 1.179 | 0.786 | 1.5 | 0 | Pink | Green |
| Ex. 7 | 71.1 | 1.09 | 16.13 | 0.39 | 0.11 | 5.87 | 0.95 | 0.78 | 1.56 | 1.081 | 0.884 | 1.222 | 0 | Pink | Green |
| Ex. 8 | 71.1 | 1.09 | 16.13 | 0.39 | 0.11 | 5.87 | 0.95 | 0.78 | 1.56 | 1.179 | 0.786 | 1.5 | 0.0044 | Violet | Emerald |
| Ex. 9 | 71.1 | 1.09 | 16.13 | 0.39 | 0.11 | 5.87 | 0.95 | 0.78 | 1.56 | 1.179 | 0.786 | 1.5 | 0.0088 | Blue | Teal |
| Ex. 10 | 71.1 | 1.09 | 16.13 | 0.39 | 0.11 | 5.87 | 0.95 | 0.78 | 1.56 | 1.179 | 0.786 | 1.5 | 0.0133 | Blue | Greenish |
| Ex. 11 | 71.1 | 1.09 | 16.13 | 0.39 | 0.11 | 5.87 | 0.95 | 0.78 | 1.56 | 1.277 | 0.688 | 1.856 | 0.0029 | Purple | Green |

TABLE 2

Reflective Color Coordinates

| Glass Composition | Thickness (mm) | D65-10 | | | F02-10 (CWF) | | | A-10 | | | CD (D65-F02) | CD (F02-A10) | CD (D65-A10) |
|---|---|---|---|---|---|---|---|---|---|---|---|---|---|
| | | L* | a* | b* | L* | a* | b* | L* | a* | b* | | | |
| Ex. 1 | 2 | 70.75 | −3.97 | 9.09 | 68.25 | −12.16 | 7.05 | 70.98 | 4.9 | 10.03 | 8.80 | 17.53 | 8.92 |
| Ex. 2 | 5.71 | 56.42 | 7.4 | 17.89 | 55.44 | −8.71 | 19.75 | 58.5 | 15.78 | 23.91 | 16.25 | 25.03 | 10.53 |
| Ex. 3 | 5.73 | 57.04 | 6.29 | 20.15 | 56.04 | −9.51 | 22.08 | 59.1 | 14.98 | 26.41 | 15.95 | 25.06 | 10.91 |
| Ex. 4 | | | | | | | | | | | | | |
| Ex. 5 | 5.73 | 56.35 | 8.95 | 13.11 | 55.33 | −7.77 | 14.83 | 58.36 | 16.37 | 19.18 | 16.84 | 24.72 | 9.79 |
| Ex. 6 | 5.71 | 56.42 | 7.4 | 17.89 | 55.44 | −8.71 | 19.75 | 58.5 | 15.78 | 23.91 | 16.25 | 25.03 | 10.53 |
| Ex. 7 | 5.73 | 57.04 | 6.29 | 20.15 | 56.04 | −9.51 | 22.08 | 59.1 | 14.98 | 26.41 | 15.95 | 25.06 | 10.91 |
| Ex. 8 | 5.71 | 44.65 | 1.75 | −0.46 | 43.62 | −11.63 | 1.09 | 44.97 | 4.13 | 3.67 | 13.51 | 16.03 | 4.78 |
| Ex. 9 | 5.72 | 35.66 | 1.88 | −13.43 | 34.53 | −10.52 | −12.18 | 34.88 | −2.14 | −10.3 | 12.51 | 8.60 | 5.15 |
| Ex. 10 | 5.7 | 27.8 | 5.36 | −25.16 | 26.42 | −6.72 | −24.54 | 25.97 | −6.7 | −23.15 | 12.17 | 1.46 | 12.36 |
| Ex. 11 | 5.73 | 48.03 | 4.48 | 3.11 | 47.05 | −10.02 | 4.69 | 48.92 | 8.67 | 7.63 | 14.62 | 19.01 | 6.23 |

Example 2

Multi-Fluorescent Glasses

Glass compositions having the compositions disclosed in Table 3 below were prepared by mixing 1 kg batches of sand, aluminum oxide, sodium carbonate, sodium sulfate, potassium nitrate, magnesium oxide, calcium carbonate, barium carbonate, zinc oxide, and borax, along with europium oxide, terbium oxide, cerium oxide and/or lanthanum nm and 405 nm ultraviolet light). For example, the Ex. 15 glass contains both $Eu^{3+}$ and $Tb^{3+}$ ions and glows yellow when excited at 365 nm due to the emission of both of its $Eu^{3+}$ and $Tb^{3+}$ ions. However, the same glass glows red when excited at 405 nm, since the 405 nm light only excites the red emitting $Eu^{3+}$ ions. It also glows green when excited at 488 nm which preferentially excites the green emitting $Tb^{3+}$ ions.

It should also be understood that other embodiments of praseodymium- and neodymium-containing glasses in the disclosure with the same or similar concentrations of fluorescent dopants, as shown in the Examples in Table 3, can demonstrate metamerism. Additionally, such praseodymium- and neodymium-containing glasses can exhibit the same fluorescent colors as the Examples in Table 3 upon excitation with ultraviolet (UV) light of particular wavelengths (e.g., 365 nm and 405 nm light). Table 4 shows the corresponding color coordinates for one of the glass compositions provided in Table 3.

national Publication No. WO2015/077136 ("WO '136 reference"), published on May 28, 2015, claiming the benefit of U.S. Provisional Application No. 61/905,958, filed Nov. 19, 2013, both of which are hereby incorporated by reference in their entirety. In one exemplary form, a composite structure of alternating glass layers comprising the Pr- and Nd-containing pink-to-green glass of this disclosure and a holmium-containing green-to-pink glass of the WO '136 reference can be formed for use in an anti-counterfeiting feature or scheme. As such, it is intended that the specification cover the modifications and variations of the various embodiments described herein, provided that such modifications and variations come within the scope of the appended claims and their equivalents.

TABLE 3

Multi-Fluorescent Glasses

| | Composition (mole %) | | | | | | | | | | | | | | | Fluorescent Color Excitation Wavelength | |
|---|---|---|---|---|---|---|---|---|---|---|---|---|---|---|---|---|---|
| Glass | $SiO_2$ | $Al_2O_3$ | $Na_2O$ | $K_2O$ | MgO | CaO | BaO | ZnO | $B_2O_3$ | $Nd_2O_3$ | $Pr_2O_3$ | $Eu_2O_3$ | $Tb_2O_3$ | $CeO_2$ | $La_2O_3$ | 365 nm | 405 nm |
| Ex. 12 | 71.1 | 1.09 | 16.13 | 0.39 | 0.11 | 5.87 | 0.95 | 0.78 | 1.56 | 0 | 0 | 0 | 0 | 0.39 | 1.765 | Blue | Sky blue |
| Ex. 13 | 71.1 | 1.09 | 16.13 | 0.39 | 0.11 | 5.87 | 0.95 | 0.78 | 1.56 | 0 | 0 | 0 | 1.865 | 0.2 | 0 | Aqua | None |
| Ex. 14 | 71.1 | 1.09 | 16.13 | 0.39 | 0.11 | 5.87 | 0.95 | 0.78 | 1.56 | 0 | 0 | 0 | 1.965 | 0 | 0 | Green | None |
| Ex. 15 | 71.1 | 1.09 | 16.13 | 0.39 | 0.11 | 5.87 | 0.95 | 0.78 | 1.56 | 0 | 0 | 0.491 | 1.474 | 0 | 0 | Yellow | Red |
| Ex. 16 | 71.1 | 1.09 | 16.13 | 0.39 | 0.11 | 5.87 | 0.95 | 0.78 | 1.56 | 0 | 0 | 0.786 | 1.179 | 0 | 0 | Orange | Red |
| Ex. 17 | 71.1 | 1.09 | 16.13 | 0.39 | 0.11 | 5.87 | 0.95 | 0.78 | 1.56 | 0 | 0 | 1.965 | 0 | 0 | 0 | Red | Red |
| Ex. 18 | 71.1 | 1.09 | 16.13 | 0.39 | 0.11 | 5.87 | 0.95 | 0.78 | 1.56 | 0 | 0 | 1.566 | 0 | 0.78 | 0 | Red | Red |

TABLE 4

Reflected Color Coordinates

| | | | | | | | | | | | A-10 | | |
|---|---|---|---|---|---|---|---|---|---|---|---|---|---|
| Glass Composition | Thickness (mm) | D65-10 | | | F02-10(CWF) | | | L* | a* | b* | CD (D65-F02) | CD (F02-A10) | CD (D65-A10) |
| | | L* | a* | b* | L* | a* | b* | | | | | | |
| Ex. 12 | | | | | | | | | | | | | |
| Ex. 13 | | | | | | | | | | | | | |
| Ex. 14 | | | | | | | | | | | | | |
| Ex. 15 | | | | | | | | | | | | | |
| Ex. 16 | | | | | | | | | | | | | |
| Ex. 17 | | | | | | | | | | | | | |
| Ex. 18 | 2 | 89.19 | −0.15 | 5.88 | 89.47 | −0.03 | 6.43 | 89.57 | 1.46 | 5.95 | 0.63 | 1.57 | 1.66 |

As discussed above, in embodiments, colorants, chromophores, and fluorescent ions can be present in the glass as oxides of their respective components. Accordingly, it should be understood that when referring to oxides of colorants, chromophores, and fluorescents hereinabove, the colorants, chromophores, and fluorescents can be present as compounds other than oxides.

It will be apparent to those skilled in the art that various modifications and variations can be made to the embodiments described herein without departing from the spirit and scope of the claimed subject matter. For example, the color-changing and multichroic glass compositions of the disclosure can be combined in various forms with other color-changing glasses, e.g., the glasses contained in Inter-

What is claimed is:
1. A glass, comprising:
   $Pr_2O_3$ ranging from 0.7 to 3.0 mole %; and
   $Nd_2O_3$, ranging from 1.0 to 4 mole %,
   wherein and the ratio of $Nd_2O_3$ to $Pr_2O_3$ is greater than 1.1 and less than 1.5, and
   further wherein CoO, if present, is less than 0.01 mole % and $Fe_2O_3$, if present, is less than 0.004 mole %.
2. The glass according to claim 1, wherein $Nb_2O_5$, if present, is less than 0.5 mole %, $Ce_2O_3$, if present, is less than 1 mole %, and $Er_2O_3$, if present, is less than 1 mole %.

3. The glass according to claim 1, further comprising:
one or more fluorescent ions selected from the group consisting of oxides of Yb, Cu, Sn, Mn, Ag, Sb, Ce, Sm, Eu, Tb, Dy, Tm, and combinations thereof,
wherein a total concentration of fluorescent ions is from greater than or equal to about 0.01 mole % to less than or equal to about 5.0 mole %.

4. A glass, comprising:
$Pr_2O_3$; and
$Nd_2O_3$,
wherein ($Pr_2O_3+Nd_2O_3$) is greater than 0.2 mole % and the ratio of $Nd_2O_3$ to $Pr_2O_3$ is greater than 1 and less than 1.9, and
further wherein CoO, if present, is less than 0.01 mole % and $Fe_2O_3$, if present, is less than 0.004 mole %, and
one or more chromophores selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$,
wherein the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ chromophores is less than 0.1 mole %.

5. The glass according to claim 1, wherein the glass is characterized by a first color upon exposure to an incandescent light source and a second color upon exposure to a fluorescent light source, the first and second colors distinct from one another.

6. The glass according to claim 1, wherein the glass is further characterized by a color difference (CD) of at least 3.0 from being subjected to a D65-10 illumination condition and an F02-10 illumination condition.

7. A glass, comprising:
$Pr_2O_3$ ranging from 0.7 to 3.0 mole %, and
$Nd_2O_3$ ranging from 1.0 to 4 mole %,
wherein the ratio of $Nd_2O_3$ to $Pr_2O_3$ is greater 1.1 and less than 1.5, and
further wherein the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ chromophores, if any of the chromophores are present, is less than 0.1 mole %.

8. The glass according to claim 7, wherein $Mn_2O_3$, if present, is less than 0.04 mole %.

9. The glass according to claim 7, further comprising:
one or more chromophores selected from the group consisting of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$.

10. A glass, comprising:
$Pr_2O_3$; and
$Nd_2O_3$,
wherein ($Pr_2O_3+Nd_2O_3$) is greater than 0.2 mole % and the ratio of $Nd_2O_3$ to $Pr_2O_3$ is greater than 0.5 and less than 3, and
further wherein the sum of $V_2O_5$, $Cr_2O_3$, MnO, $Mn_2O_3$, $Fe_2O_3$, CoO, $Co_3O_4$, CuO, NiO, $Nb_2O_5$, $CeO_2$, $Ho_2O_3$ and $Er_2O_3$ chromophores, if any of the chromophores are present, is less than 0.1 mole %, and
one or more fluorescent ions selected from the group consisting of oxides of Yb, Cu, Sn, Mn, Ag, Sb, Ce, Sm, Eu, Tb, Dy, Tm, and combinations thereof,
wherein a total concentration of fluorescent ions is from greater than or equal to about 0.01 mole % to less than or equal to about 5.0 mole %.

11. The glass according to claim 7, wherein the glass is characterized by a first color upon exposure to an incandescent light source and a second color upon exposure to a fluorescent light source, the first and second colors distinct from one another.

12. The glass according to claim 7, wherein the glass is further characterized by a color difference (CD) of at least 3.0 from being subjected to a D65-10 illumination condition and an F02-10 illumination condition.

13. A glass, comprising:
$SiO_2$ at greater than 70 mole %;
$Pr_2O_3$ ranging from 0.7 to 3.0 mole %; and
$Nd_2O_3$ ranging from 1.0 to 4 mole %,
wherein the ratio of $Nd_2O_3$ to $Pr_2O_3$ is greater than 1.1 and less than 1.5, and
further wherein the sum of $Fe_2O_3$, $CeO_2$, and $TiO_2$, if any are present, is less than 1 mole %.

14. The glass according to claim 13, wherein the sum of $Mn_2O_3$, $Fe_2O_3$, NiO and $CeO_2$, if any are present, is less than 2 mole %.

15. A glass article, comprising:
a substrate comprising a glass according to claim 12, wherein the substrate further comprises a compressive stress region having a maximum compressive stress of at least 50 MPa and a depth of layer (DOL) of at least 15 microns in thickness.

16. A glass article, comprising:
a substrate comprising a glass according to claim 1, wherein the substrate further comprises a compressive stress region having a maximum compressive stress of at least 50 MPa and a depth of layer (DOL) of at least 15 microns in thickness.

17. A glass article, comprising:
a substrate comprising a glass according to claim 13, wherein the substrate further comprises a compressive stress region having a maximum compressive stress of at least 50 MPa and a depth of layer (DOL) of at least 15 microns in thickness.

* * * * *

UNITED STATES PATENT AND TRADEMARK OFFICE
CERTIFICATE OF CORRECTION

PATENT NO. : 11,535,549 B2
APPLICATION NO. : 16/093459
DATED : December 27, 2022
INVENTOR(S) : Matthew John Dejneka Page 1 of 1

It is certified that error appears in the above-identified patent and that said Letters Patent is hereby corrected as shown below:

In the Claims

In Column 22, Line 61, in Claim 1, after "wherein" delete "and".

In Column 23, Line 15, in Claim 4, delete "mole %, and" and insert -- mole %; and, --.

In Column 23, Line 18, in Claim 4, delete "$CO_3O_4$," and insert -- $Co_3O_4$, --.

In Column 23, Line 20, in Claim 4, delete "$CO_3O_4$," and insert -- $Co_3O_4$, --.

In Column 23, Line 32, in Claim 7, delete "mole %," and insert -- mole %; --.

In Column 23, Line 34, in Claim 7, after "greater" insert -- than --.

In Column 23, Line 37, in Claim 7, delete "$CO_3O_4$," and insert -- $Co_3O_4$, --.

In Column 24, Line 2, in Claim 10, delete "$CO_3O_4$," and insert -- $Co_3O_4$, --.

In Column 24, Line 4, in Claim 10, delete "mole %," and insert -- mole %; --.

In Column 24, Line 33, in Claim 15, delete "12," and insert -- 7, --.

Signed and Sealed this
First Day of August, 2023

Katherine Kelly Vidal
*Director of the United States Patent and Trademark Office*